(12) United States Patent
English et al.

(10) Patent No.: US 7,373,640 B1
(45) Date of Patent: May 13, 2008

(54) TECHNIQUE FOR DYNAMICALLY RESTRICTING THREAD CONCURRENCY WITHOUT REWRITING THREAD CODE

(75) Inventors: Robert M. English, Menlo Park, CA (US); Zdenko Kukavica, Mountain View, CA (US); Konstantinos Roussos, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 838 days.

(21) Appl. No.: 10/631,930

(22) Filed: Jul. 31, 2003

(51) Int. Cl.
*G06F 9/44* (2006.01)
*G06F 9/46* (2006.01)

(52) U.S. Cl. .................. 717/149; 718/107; 712/203; 712/216

(58) Field of Classification Search ................ 717/149; 712/203, 216
See application file for complete search history.

(56) References Cited

U.S. PATENT DOCUMENTS

| | | | |
|---|---|---|---|
| 5,819,292 | A | 10/1998 | Hitz et al. |
| 5,963,962 | A | 10/1999 | Hitz et al. |
| 6,038,570 | A | 3/2000 | Hitz et al. |
| 6,269,391 | B1* | 7/2001 | Gillespie ................ 718/100 |
| 2004/0268292 | A1* | 12/2004 | Steeb et al. .............. 717/100 |

OTHER PUBLICATIONS

Robert M. English, U.S. Patent Application (Matter No. 103.1032.01) titled Low-Overhead Threads in a High-Concurrency System.
Rajan, et al., U.S. Patent Application (Matter No. 103.1063.01) titled Symmetric Multiprocessor Synchronization Using Migrating Scheduling Domains.
David Hitz et al., TR3002 File System Design for a NFS File Server Appliance published by Network Appliance, Inc. 2005.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al., (1999) Request for Comments (RFC) 2616. HTTP/1.1.

* cited by examiner

*Primary Examiner*—Eric B. Kiss
(74) *Attorney, Agent, or Firm*—Cesari and McKenna, LLP

(57) ABSTRACT

The present invention provides a technique for converting a multi-threaded application configured to execute on a uniprocessor (UP) system to one that executes on a multiprocessor (MP) system. Unlike previous approaches, a novel scheduling technique is employed so that different UP-coded user-level threads ("sthreads") can execute concurrently in the MP system without having to rewrite their original code. To that end, the UP-coded sthreads are organized into different concurrency groups, each of which defines a set of one or more sthreads not permitted to execute concurrently. By grouping the UP-coded sthreads in this manner, different concurrency groups can be scheduled to execute their UP-coded sthreads at substantially the same time without incorporating traditional synchronization mechanisms into the sthreads' original UP code.

31 Claims, 10 Drawing Sheets

TECHNIQUE FOR DYNAMICALLY RESTRICTING THREAD CONCURRENCY WITHOUT REWRITING THREAD CODE

FIELD OF THE INVENTION

The present invention relates to multi-threaded processes and, more specifically, to a technique for a multiprocessor system to concurrently execute threads originally configured to run on a uniprocessor system.

BACKGROUND OF THE INVENTION

A computer system comprising a single processor is referred to as a uniprocessor (UP) system. Typically, the UP system initially loads an operating system to manage all other program code executed by the processor. A set of core services provided by the operating system is often coded in the operating system's kernel. Such services may include, among other things, providing file-system semantics, input/output (I/O) operations, memory management, network communications, and the like. A kernel may be embodied as a microkernel that organizes the kernel's services in relatively small, configurable is modules. In this sense, the Data ONTAP™ operating system, available from Network Appliance, Inc. of Sunnyvale, Calif., is an example of an operating system implemented as a microkernel.

In general, kernel code in a uniprocessor system may be divided into multiple segments of program code. Each program defines a specific set of ordered operations that are performed by the processor. A process refers to an instance of a program being executed by the processor. Accordingly, UP system resources, such as memory address space and processor bandwidth, may be divided among multiple processes. Moreover, the resources may be allocated to both user and kernel processes. Here, a kernel process implements one or more of the kernel's services. In contrast, a user process provides a service, such as word processing, web browsing, image editing, software developing, etc., for a user.

Typically, a process scheduler controls when different processes are executed by the processor. In some implementations, the process scheduler is integrated into the kernel ("kernel-level"). Other implementations code the scheduler outside the kernel ("user-level"). The process scheduler maintains a run queue that governs the order in which processes are executed by the processor. Thus, the scheduler dequeues a process for the processor to execute, then re-enqueues the process after an appropriate time interval elapses or the processor finishes the process's execution.

In practice, a process in a UP system often may be interrupted (i.e., "stalled") by the processor so other operations can be performed in the system. For instance, the kernel may recognize an I/O interrupt signal having higher priority than the executing process. In this case, the process may be stalled while the processor performs appropriate I/O operations. Similarly, other process interruptions may include memory page faults, segmentation faults, error handling routines, and so forth.

A process often employs one or more threads to minimize processor stalling and make more efficient use of the processor's bandwidth while the process is being executed. Each thread is an instance of a sequence of the process's program code. For instance, a user-level thread is an instance of a sequence of the process's program code which is not included in the kernel's code. The threads allow the process to keep the processor busy, even in the presence of conventional process interruptions, such as I/O interrupts, page faults, etc. To that end, the process can perform "blocking" operations when an executing thread is interrupted, thereby suspending that thread's execution and beginning execution of a different thread. In this manner, the process can continuously execute thread code for as long as the process is scheduled to execute on the processor.

As used herein, one or more workloads may be multiplexed on an execution vehicle that executes the workloads in an orderly manner. For example, when the workloads are user-level threads, one or more of the user-level threads may be multiplexed on an execution vehicle, such as a kernel process, through which they are executed. Specifically, the process scheduler may allot a time interval for a kernel process to execute, and the kernel process may divide its allotted time among its user-level threads. To that end, a thread scheduler may be used to control when the process's different user-level threads are executed by the processor. The thread scheduler allows the process to continue executing even when one or more threads block, thereby maximizing utilization of the process's scheduled processor during the process's time slice. Thus, in the absence of other processors, the thread scheduler maximizes the system's processor utilization.

Each thread is associated with a thread context that supplies the processor with meta-data information needed to execute the thread. For instance, a thread's associated program-counter value, stack-pointer value, hardware register values, etc. are stored in its thread context. Each thread context is typically stored in a corresponding data structure called a thread control block (TCB). Although threads are associated with their own thread-specific meta-data information, multiple threads may share access to a common process context that contains process-specific meta-data information shared among the threads. The process context may include global variables, memory address spaces, semaphores, etc., defining the process's computing environment. Typically, the process context is stored in a corresponding data structure known as a process control block (PCB).

Thread contexts are typically smaller (i.e., "lightweight") than their associated process contexts, so switching thread contexts generally consumes less resources, such as processor bandwidth and memory, than switching process contexts. Furthermore, a new thread is typically not allocated many of the resources, such as "heap" memory, run-time libraries, etc., that are allocated to a new process. In fact, only a TCB and a call stack are typically allocated when a new thread is created; other resources are previously allocated at the time the thread's process is created. Thus, threads may be dynamically created and destroyed using less overhead (i.e., resource consumption) than processes since they not only require less context information, but also require less resource allocation. Notably, threads need not be lighter than processes in every dimension. For example, it is possible to have threads which consume less memory than a process, even if they execute less efficiently and/or require more time to context switch.

While multi-threading techniques may be used to ensure efficient use of the processor in a UP system, threads also facilitate efficient processing in a multi-processor (MP) system. As used herein, two or more processors in an MP system execute concurrently if they are scheduled to execute program code at substantially the same time. A process scheduler in an MP system traditionally determines which processors execute processes in the scheduler's run queue. For instance, the scheduler may assign a first processor to execute a first process, and at the same time assign a second processor to execute a second process. In this case, the first and second processors may concurrently execute user-level threads multiplexed over their respective first and second processes. Accordingly, thread schedulers associated with the first and second processes may be used to schedule user-level thread execution on the first and second processors, thereby maximizing utilization of both processors' bandwidths.

However, problems often arise in an MP system when concurrently executing processors attempt to access (i.e., read or write) the same data at substantially the same time. For example, a processor may attempt to modify data, while the same data is being accessed or processed by another processor. As a result, modifications made to the data may be known to one processor and not the other, thus causing inaccuracies or errors in one or both of the processors' execution. To prevent such conflicts, synchronization mechanisms are often employed to give processors exclusive access to shared data. Conventional synchronization techniques include, inter alia, global locks, monitors, domains and master/slave approaches.

A unique global lock may be associated with each data structure allocated in an MP system. According to this synchronization technique, a sequence of program code, such as a thread or process, must "acquire" a global lock before it can access data in the lock's associated data structure. When the program code is finished accessing the data, it "releases" the global lock. For example, a thread may acquire a global lock by setting the lock to a first value (e.g., "1"), then later release the lock by setting it to a second value (e.g., "0"). Illustratively, the lock's value may be stored in a special "lock" data structure, although those skilled in the art will appreciate other implementations are possible as well. Broadly stated, a global lock is a type of mutual exclusion ("mutex") lock since it can only be possessed by one thread or process at a time. Threads or processes may either "block" while waiting for mutex locks to be released or may loop to repeatedly check the status of a lock held by another thread or process. The latter process is called "spinning" and mutex locks that require spinning are known as spin locks.

While a global lock synchronizes access to an individual data structure, a monitor synchronizes execution of different segments of program code, such as threads. In general, a monitor is a program that manages the interactions of other segments of program code. Typically, a monitor is associated with a monitor lock that can be acquired by only one thread or process at a time. For example, suppose one or more data structures is shared among a set of threads, and each of the threads executes through a common monitor. Since the monitor's lock only allows one of the threads to acquire the monitor at any given time, the lock prevents multiple threads from accessing the shared data structures at the same time. When the threads are scheduled to execute on different processors in an MP system, the monitor can therefore control their concurrent access to the shared data structures.

A domain typically protects a larger amount of program code than a monitor. More specifically, a programmer may organize a program's code into a plurality of distinct code segments, or domains, that can execute concurrently in an MP system. However, processes and threads within the same domain usually may not execute concurrently. Further, each instance of a function or data type allocated in a domain is accessible to only one specific thread or process executing in that domain. Each domain is typically associated with its own domain-specific context information and resources. Before a domain can load its context information and execute its processes and threads, the domain first must acquire its associated domain lock. The domain lock prevents multiple instances of the domain's threads and processes from executing concurrently on different processors in the MP system. Synchronization using domains is usually determined at compile-time and is further described in more detail in commonly assigned application Ser. No. 09/828/271, entitled "Symmetric Multiprocessor Synchronization Using Migrating Scheduling Domains," to Rajan et al., which is hereby incorporated by reference as though fully set forth herein.

A master/slave implementation assigns each process that can execute in an MP system to a "master" or "slave" processor. Specifically, program code that cannot execute concurrently in an MP system is assigned to a master processor. Other program code may be executed concurrently in the MP system by one or more slave processors. In this manner, a software programmer controls which threads and processes execute concurrently in the MP system by choosing whether each process or thread executes on a master or slave processor. Thus, unlike the other synchronization techniques previously described, the master/slave approach requires the programmer to predetermine which processors will execute different processes in a software application.

While conventional synchronization techniques enable multiple processes and threads to execute concurrently in an MP system, they are not easily implemented in program code originally designed to execute in a UP system. For instance, converting a UP-coded thread to employ global locks in an MP system requires adding extra code to the thread for acquiring and releasing the locks. Firstly, this additional code may be time consuming to incorporate. Secondly, the extra code adds overhead to the thread even if the thread never executes concurrently with other threads, and therefore may unnecessarily slow the thread's execution. Thirdly, incorporating this additional code into the UP-coded thread may result in the thread consuming an unacceptable amount of memory resources in the MP system. In addition, MP-system synchronization using global locks may lead to "deadlocks." For example, suppose a first thread in the MP system seeks to acquire global lock A then B, and a second thread seeks to acquire global lock B then A. In this case, the first and second threads block one another. If one of the locks A or B is critical to the system, the entire system can freeze. Programming around such issues can considerably complicate MP development and reduce the efficiency of the MP code.

Similarly, converting a UP-coded thread to employ monitors in an MP system also requires additional code to be added to the thread. For example, the thread must be configured to acquire and release monitor locks. Further, the thread must be modified to incorporate signaling and blocking mechanisms typically associated with monitors. In sum, the UP-coded thread would have to be re-written within a monitor paradigm. This process of re-writing and redesigning the thread's code is costly in terms of both time and development resources.

In general, some system architectures align well with domain synchronization techniques, while others do not. Thus, converting a UP-coded thread to implement domains in an MP system may require re-architecturing of the thread's code to ensure its compatibility with the MP system's architecture. For instance, a programmer typically must divide the original UP-coded program code into individual domains. Although statically allocating blocks of domain code may simplify debugging operations, the process of splitting large amounts of program code into domains is typically an arduous process. For instance, the UP-coded processes and threads within a domain must be modified in accordance with the domain's synchronization mechanisms, e.g., to properly utilize the domain's associated domain lock, domain context, domain identifiers, etc. The process of re-writing and redesigning the UP threads' code to employ domain synchronization mechanisms typically consumes excessive software-development time and resources. Furthermore, domains may be of limited use in the MP system since each instance of a function or data type allocated in a domain is typically only manipulated by a single thread or process.

Lastly, converting a UP-coded thread to execute in a master/slave configuration requires a programmer to assign the thread to execute on a master or slave processor in the MP system. According to the master/slave approach to concurrency, a UP-coded thread assigned to a slave processor must be rewritten to make it MP safe with respect to all of the other threads in the MP system. Thus, the master/slave approach suffers the disadvantage of having to incorporate conventional synchronization mechanisms into UP thread code assigned to the slave processors.

It is therefore desirable to convert a UP-coded thread for use in an MP system without having to modify the original thread code. The thread should not have to be recoded or augmented with additional code in order to execute in the MP system. Also, the thread should be able to cooperate with other threads and/or processes to access instances of functions and data types allocated in the MP system. Further, the UP thread code should not be "bound" to any particular hardware implementation, and should easily scale when processors are added or removed in the MP system. It is also desirable that the same thread code can function in both the UP and MP systems.

SUMMARY OF THE INVENTION

The present invention provides a technique for converting a multi-threaded application configured to execute on a uniprocessor (UP) system to one that executes on a multiprocessor (MP) system. Unlike previous approaches, a novel scheduling technique is employed so that different UP-coded user-level threads ("sthreads") can execute concurrently in the MP system without having to rewrite their original code. To that end, the UP-coded sthreads are organized into different concurrency groups, each of which defines a set of one or more sthreads not permitted to execute concurrently. By grouping the UP-coded sthreads in this manner, different concurrency groups can be scheduled to execute their UP-coded sthreads at substantially the same time without incorporating traditional synchronization mechanisms into the sthreads' original UP code.

According to an illustrative embodiment, one or more execution vehicles, such as kernel processes, may be associated with a run queue of concurrency groups (CG). A first process executing in the MP system may dequeue a first concurrency group from the "head" of the CG run queue. The first process then locates a queue of "active" (i.e., executable) UP-coded sthreads in the first concurrency group and sequentially executes the active sthreads to completion. At substantially the same time as sthreads in the first dequeued concurrency group are being executed, a second process executing in the MP system may dequeue a second concurrency group from the CG run queue. In this case, UP-coded sthreads in the two dequeued concurrency groups may be executed at substantially the same time by the first and second processes. Similarly, additional processes in the MP system may dequeue concurrency groups from the CG run queue and concurrently execute sthreads in their respective dequeued concurrency groups.

Advantageously, the present invention minimizes the need to incorporate conventional synchronization mechanisms, e.g., global locks, monitors, domains, etc., into UP-coded sthreads to ensure their safe execution in an MP system. Consequently, the invention reduces the traditional amounts of time and programming resources required to incorporate synchronization mechanisms into UP-code. In further contrast to conventional domain synchronization techniques, UP-coded sthreads in the invention may be dynamically assigned to different concurrency groups at run-time, and instances of functions and data types allocated in the MP system each may be accessible to multiple UP-coded sthreads. Also, the present invention easily scales for MP systems having an arbitrary number of processors, e.g., one or more processors.

BRIEF DESCRIPTION OF THE DRAWINGS

The above and further advantages of the invention may be better understood by referring to the following description in conjunction with the accompanying drawings in which like reference numerals indicate identically or functionally similar elements.

DETAILED DESCRIPTION OF ILLUSTRATIVE EMBODIMENTS

A. Networking Environment

Figure 1:
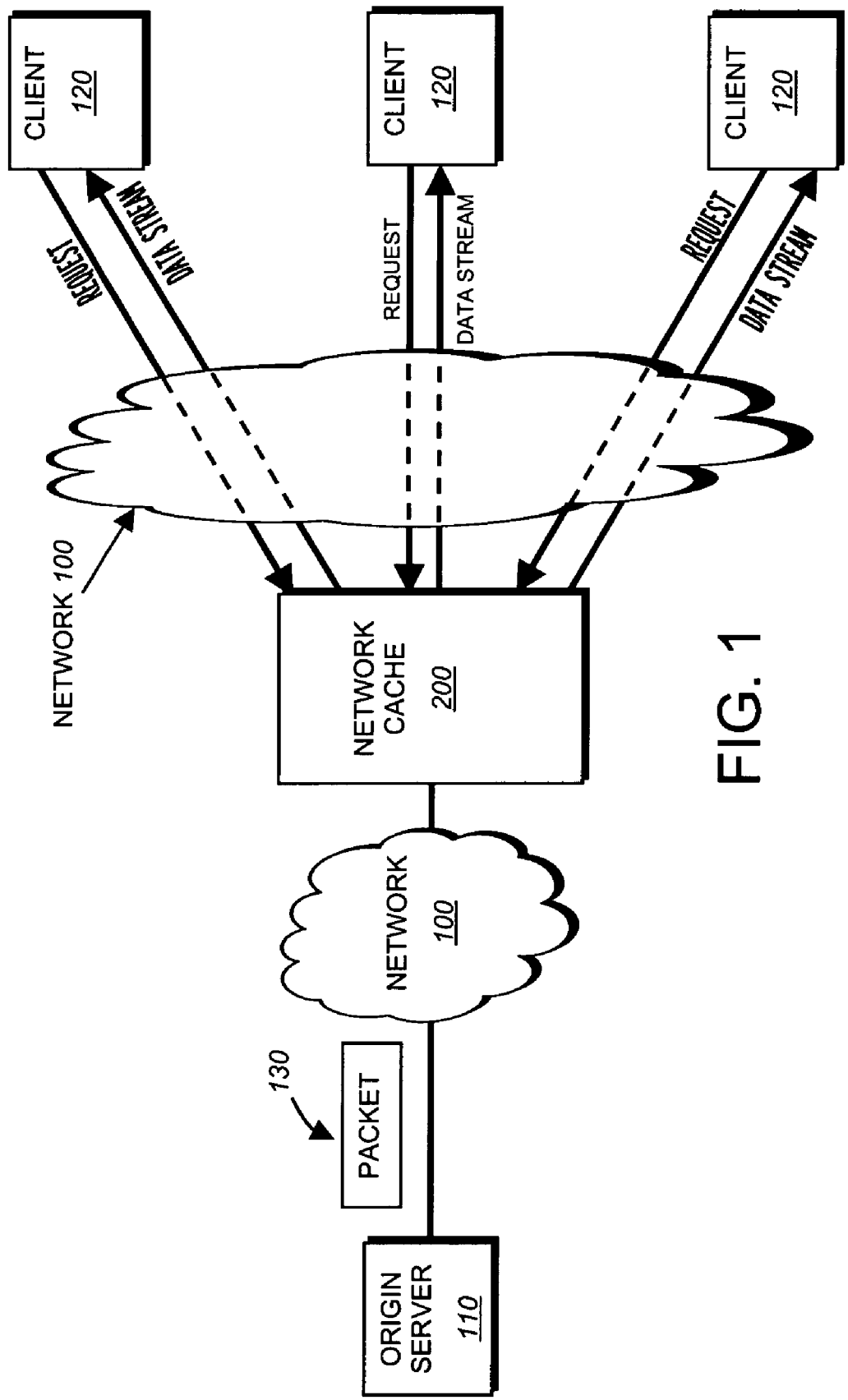
FIG. 1 is a schematic block diagram of an exemplary network including an illustrative network cache which may be used to implement the present invention.

FIG. 1 illustrates a network cache (server) which may be used to implement the present invention. The network cache 200 is coupled to an origin server 110 and a plurality of clients 120 over a network 100. The network cache typically communicates with the origin server and the clients by exchanging discrete data packets 130 over the network. As used herein, a data packet is broadly understood to be a unit of data transmitted over the network. As such, a data packet according to the invention may comprise one or more conventional data packets. Typically, the packets are formatted in accordance with predetermined communication protocols, such as the Transmission Control Protocol (TCP), User Datagram Protocol (UDP) and the Internet Protocol (IP). In this context, a protocol consists of a set of rules defining how packets are communicated. Each data packet generally comprises "payload" data appended to one or more network headers that define the packet's routing through the network.

The network 100 contains a plurality of interconnected "nodes," i.e., computers, including the network cache 200, the origin server 110, and the plurality of clients 120. The network may be organized to include wide area networks (WAN), shared local area networks (LAN), point-to-point links, virtual private networks (VPN) implemented over a public network such as the Internet, and so forth. Intermediate network devices (not shown), such as conventional routers and switches, in the network 100 typically provide network services that facilitate the transmission of data packets between nodes. For example, a Web Cache Coordination Protocol (WCCP) router in the network may be configured to forward data packets communicated between the clients 120 and the network cache 200.

In operation, a client 120 sends a request for a data stream, or a portion of a data stream, over the network 100 to the network cache 200. The requested data stream may comprise digitized representations of audio data, video data, static images, executable files, and the like, or any combination thereof. The client's request may take the form of a Uniform Resource Locator (URL), a Hypertext Transport Protocol (HTTP) message, etc. After receiving the request, the network cache determines whether it has a previously stored copy of the requested data stream. If so, it returns a copy of the requested data stream to the client.

In particular, the network cache 200 may retrieve the client-requested data stream from its "permanent," e.g., non-volatile, storage media and/or from its "in-core" memory, such as random access memory (RAM). For instance, in a video-on-demand (VOD) configuration, the network cache may retrieve a client-requested video data stream from one or more of its storage disks. Alternatively, a client-requested "live" video data stream, e.g., received from the origin server 110, may be retrieved from the network cache's in-core memory.

If the client-requested data stream is not resident in the network cache, the cache 200 may, in turn, send a request to the origin server to retrieve it. Here, the origin server 110 is a computer that provides the network cache with copies of data streams that may be served to the plurality of clients 120. In this arrangement, the network cache serves as an "accelerator" for the origin server. That is, a larger number of clients can concurrently access an origin server's data stream through the network cache than through the origin server itself. As such, the network cache can prevent high volumes of network traffic from "overloading" the origin server's network resources, e.g., its available bandwidth and memory.

B. Multiprocessor Systems

Figure 2:
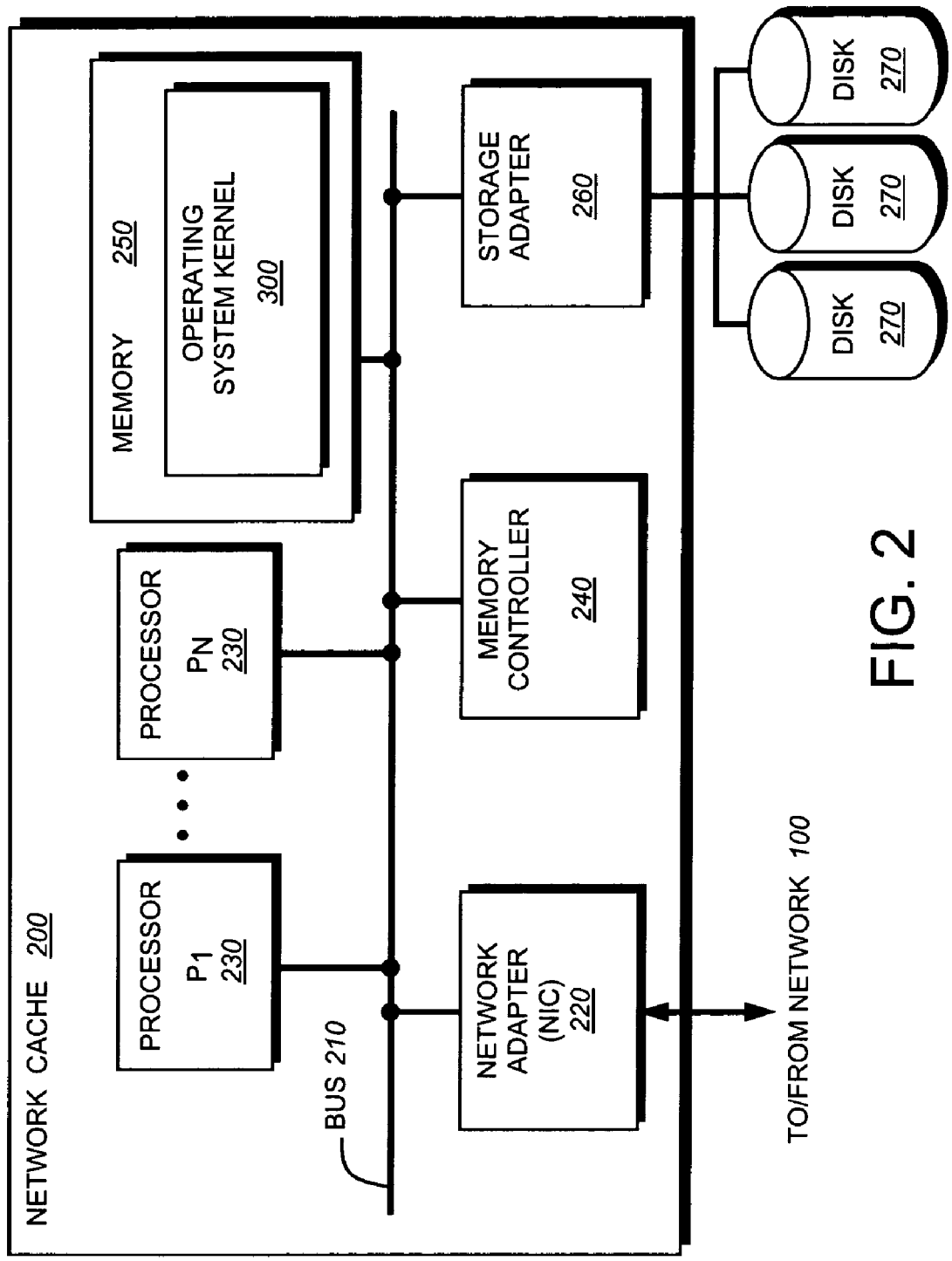
FIG. 2 is a schematic block diagram illustrating an exemplary multiprocessor computer system which may be embodied by FIG. 1's illustrative network cache.

FIG. 2 is a multiprocessor computer system that may be used to embody the illustrative network cache 200. More generally, the multiprocessor computer system may be implemented in any type of special-purpose computer (e.g., server) or general-purpose computer, including a standalone computer. As shown, the network cache 200 comprises a network adapter 220, a plurality of processors 230 (i.e., N processors where N is an integer value greater than one), a memory controller 240, a memory 250 and a storage adapter 260 interconnected by a system bus 210.

The network adapter 220 sends and receives data to/from other computers connected to the network cache 200, e.g., over an Ethernet link, a synchronous optical network (SONET) link, a wireless connection, etc. Specifically, the network adapter comprises the mechanical, electrical and signaling circuitry needed to connect the network cache 200 to a client 120 over the computer network 100. The adapter 220 may also include specialized processing elements, such as logic or processors, that format incoming and out-going data packets consistent with a predetermined network communication protocol. The network adapter may be implemented by components and circuitry on a network interface card (NIC), as known in the art.

The storage adapter 260 cooperates with an operating system kernel 300 to access client-requested data streams stored on the disks 270. The storage disks (or other storage devices) are attached, via the storage adapter 260, to the network cache 200. The storage adapter includes input/output (I/O) interface circuitry that couples to the disks over an I/O interconnect arrangement, such as a conventional high-performance, Fibre Channel serial link topology. Illustratively, a request for a client-requested data stream may be received at the network adapter 220, which communicates the request to the storage adapter 260 in accordance with the operating system kernel 300. The requested data stream is retrieved by the storage adapter and may be processed by one or more of the processors 230 or by the adapter 260 itself. The data stream is then forwarded over the system bus 210 to the network adapter 220, where it may be formatted into packets and sent to the requesting client 120.

The memory 250 comprises storage locations that are addressable by the processors and adapters for storing data and program code. The memory comprises a form of random access memory (RAM) that is generally cleared by a power cycle or other reboot operation (e.g., it is a "volatile" memory). Those skilled in the art will appreciate that other memory means, such as FLASH memory media, may also be used for storing program instructions and data structures in the memory 250. The memory may be partitioned, physically or logically, to divide its address space among the different processors 230 and adapters 220 and 260. However, in an illustrative embodiment, one or more of the processors 230 share access to a common set of memory addresses. Data and instructions stored in the memory 250 may be addressed using the memory controller 240. More specifically, the controller enables addressed portions of the memory's contents to be communicated over the bus 210.

Portions of the operating system kernel 300 are typically resident in the memory 250. The term "operating system" as used herein generally refers to computer-executable code that manages all other program code in a computer system, such as the multiprocessor system embodied by network cache 200. A set of core services provided by the operating system is often coded in the operating system's kernel 300. Such services may include, among other things, providing file system semantics, I/O operations, memory management and the like. The kernel may be embodied as a microkernel that organizes the kernel's services in relatively small, configurable modules. In this sense, the Data ONTAP™ operating system, available from Network Appliance, Inc. of Sunnyvale, Calif., is an example of an operating system implemented as a microkernel. The operating system kernel 300 can also be implemented as an application program operating over a general-purpose operating system, such as UNIX® or Windows NT®, or as a general-purpose operating system with configurable functionality, which is configured for multi-threaded applications as described herein.

Figure 3:
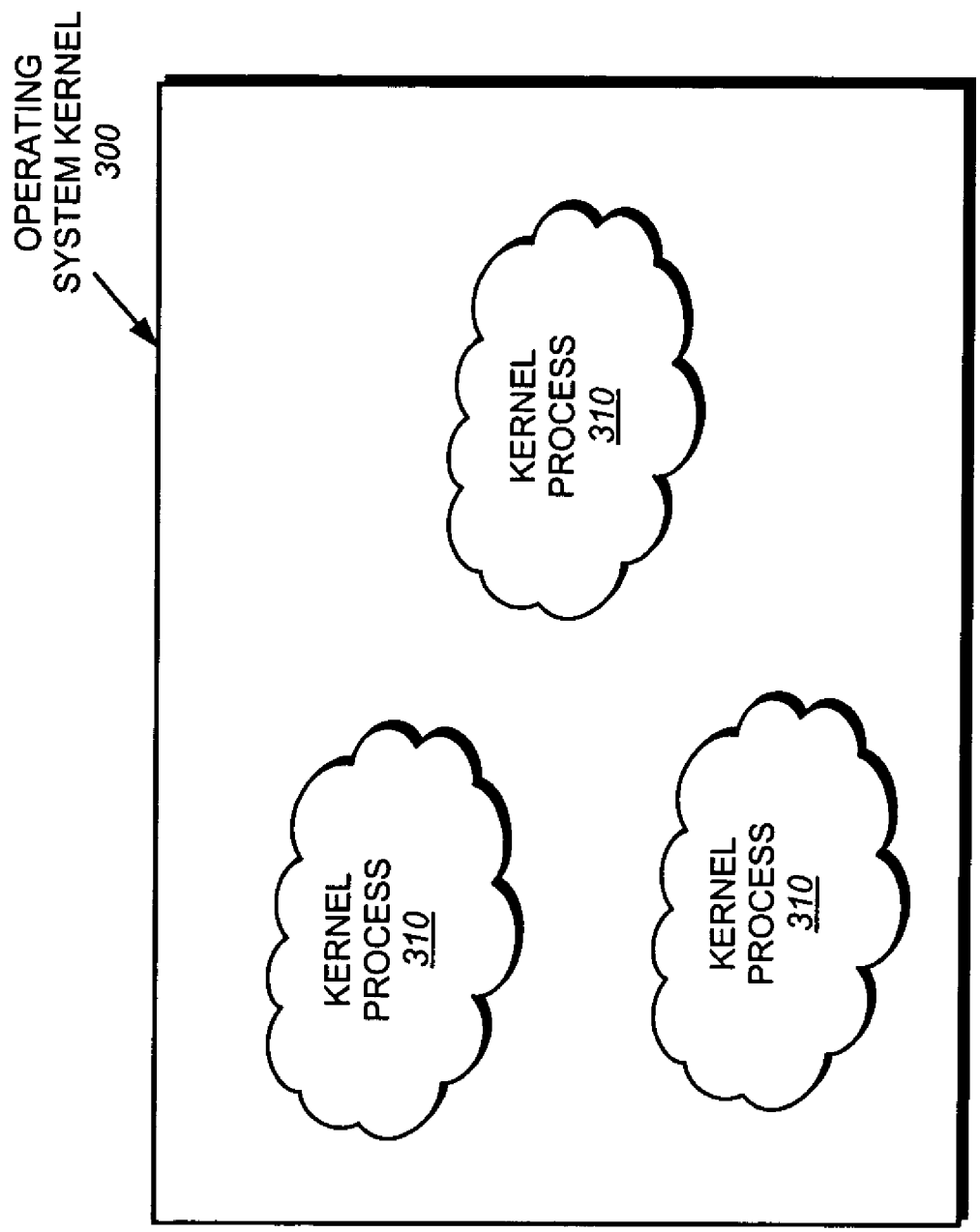
FIG. 3 is a schematic block diagram illustrating kernel processes that may be executed by an operating system kernel executing in FIG. 1's illustrative network cache.

FIG. 3 is a schematic block diagram illustrating the exemplary operating system kernel 300. The kernel may provide its operating-system services through a plurality of kernel processes 310. For example, such kernel processes may include network-caching processes that provide network access to data streams stored in the memory 250 or on the disks 270, file-system processes that provide the operating system's file-system semantics and network-communication processes that provide support for transmitting and receiving data over the network 100. Of course, those skilled in the art will appreciate that other kernel processes, in addition to those listed above, may also be implemented by the operating system kernel 300 without loss of generality.

Figure 4:
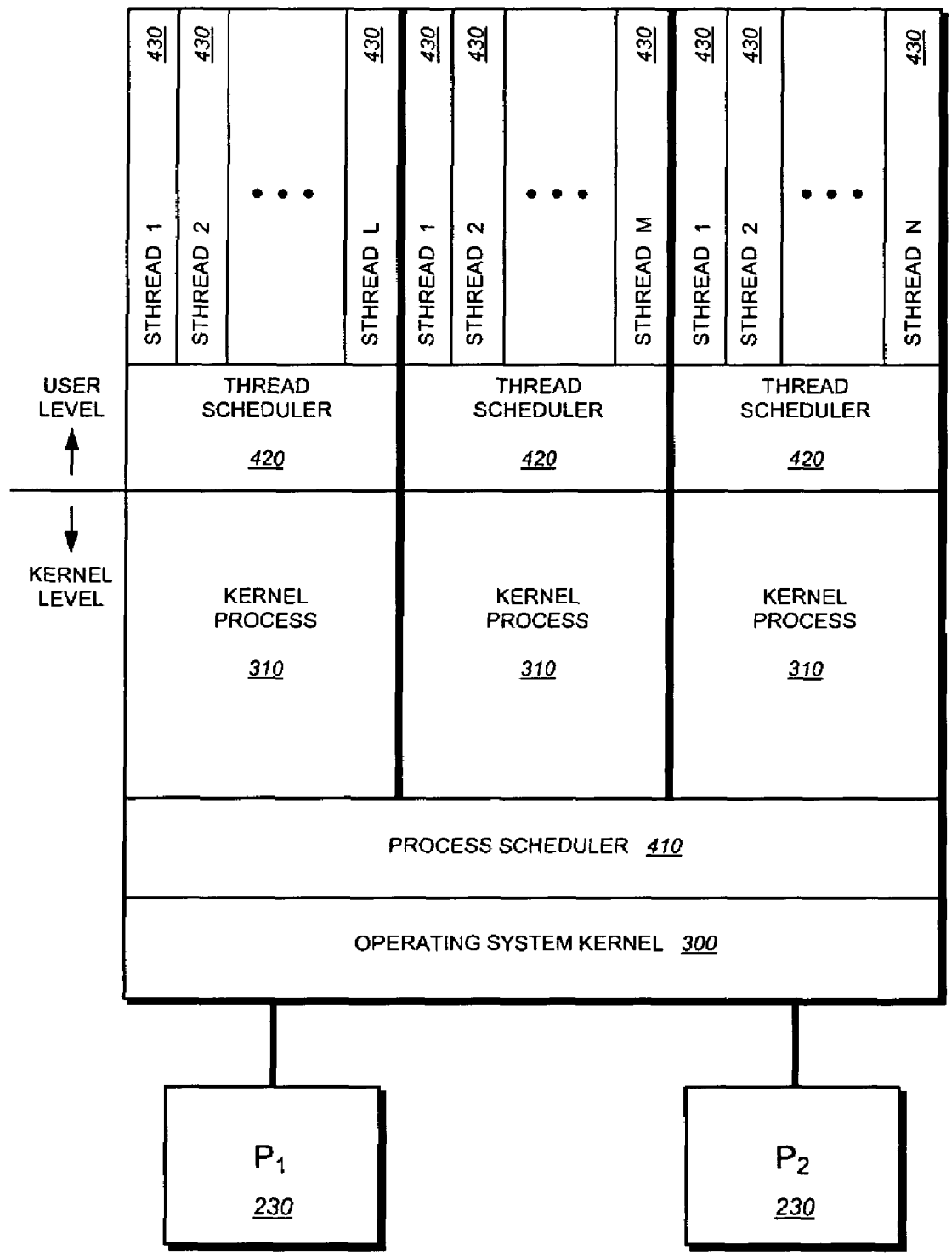
FIG. 4 is a schematic block diagram illustrating user-level threads ("sthreads") which may be multiplexed on kernel processes in FIG. 1's illustrative network cache.

FIG. 4 is a schematic block diagram illustrating user-level threads 430 ("sthreads") which may be executed by the processors 230 in the illustrative network cache 200. As shown, two illustrative processors 230 ($P_1$ and $P_2$) implement an operating system's core services through program code embodied in the operating-system kernel 300. While the illustrated embodiment only depicts two processors 230, those skilled in the art will understand that any arbitrary number of the processors $P_1$ through $P_N$ may be coupled to the kernel 300. A set of kernel processes 310 is instantiated by the kernel to implement a set of the operating system's core services. As noted, such kernel processes may include network-caching processes, file-system processes and network-communication processes.

Advantageously, the kernel 300 is coupled to a process scheduler 410 which determines when the kernel processes 310 are executed by the processors 230 and also determines which processors execute which processes. The process scheduler 410 may be incorporated directly into the kernel 300, or, alternatively, the process scheduler may be a separate program which is interfaced (e.g., dynamically linked) to the kernel's program code. In practice, the process scheduler schedules a kernel process to execute on a processor until the process's execution has completed or a predetermined period of time has expired. Execution of the kernel process may be interrupted or otherwise blocked, e.g., due to I/O routines, memory faults, error-handling routines, etc. Therefore, each kernel process 310 may be associated with a corresponding thread scheduler 420 that is used to minimize the amount of time the process is inactive (i.e., not executing) during its scheduled time period.

Each thread scheduler 420 manages one or more sthreads 430 that are multiplexed over the thread scheduler's associated kernel process 310. In other words, the kernel process serves as an execution vehicle through which its sthreads are executed by an appropriate processor 230. The thread scheduler determines the order in which the kernel process's sthreads 430 are executed. To that end, the scheduler 420 may maintain a run queue of "active" sthreads that are ready to be executed (i.e., not in a "blocked" state). The kernel process may dequeue an sthread from the "head" of its thread scheduler's run queue and execute the dequeued sthread to completion. In an illustrative embodiment, the kernel process 310 functions as a continuous loop (i.e., an "sthread loop") for the duration of the process's scheduled time period, whereby the loop continuously dequeues and executes sthreads from its thread scheduler 420's run queue of active sthreads. Those skilled in the art will appreciate that the run queue may be stored and accessed in a variety of different ways. For example, the sthread run queue for a thread scheduler 420 associated with a kernel process 310 may be accessible through the kernel process's process control block (PCB).

C. Concurrency Groups

The present invention provides a technique for converting a multi-threaded application configured to execute on a uniprocessor (UP) system to one that executes on a multiprocessor (MP) system. Unlike previous approaches, different UP-coded user-level threads ("sthreads") can execute concurrently in the MP system without having to incorporate conventional synchronization mechanisms, such as global locks, monitors, domains, etc., into their original code. To that end, the UP-coded sthreads are organized into different concurrency groups (CG), each of which defines a set of one or more sthreads not permitted to execute concurrently. Advantageously, UP-coded sthreads in a first CG may be executed by a kernel process running on a first processor at substantially the same time as UP-coded sthreads in a second CG are executed by a different kernel process running on a second processor.

UP-coded sthreads may be assigned to concurrency groups in various ways. For example, while developing program code for a kernel process 310, a software developer may organize the kernel process's UP-coded sthreads 430 into different concurrency groups based on which sthreads share access to a common set of data structures. That is, sthreads having access to the same data structures are assigned to the same CG. Sthreads may be assigned to concurrency groups at run-time as well. For instance, if a second sthread is dynamically instantiated during execution of a first sthread (i.e., by a "call" instruction), then the second sthread may be automatically assigned to the same CG as the first sthread. It is also contemplated that sthreads may be assigned to different concurrency groups at compile-time. For example, two sthreads may be assigned to the same CG when the compiler determines that the sthreads contain instructions for accessing a common set of memory addresses in the memory 250.

Figure 5:
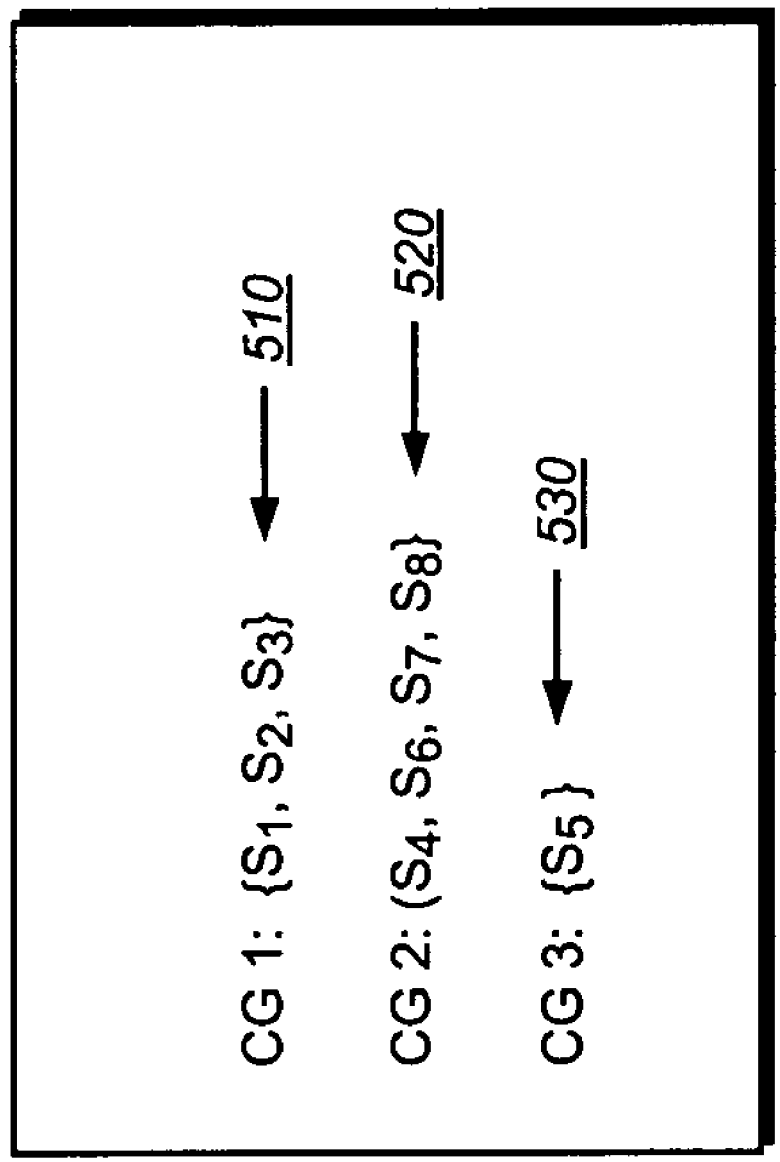
FIG. 5 is a schematic block diagram illustrating an exemplary arrangement of UP-coded sthreads which may be grouped into different concurrency groups in accordance with the present invention.

By way of example, assume a set of eight UP-coded sthreads ($S_1$ through $S_8$) are "migrated" from a UP system to an MP system. FIG. 5 illustrates an exemplary arrangement of these sthreads grouped into three different concurrency groups 510, 520 and 530 (labeled CG1, CG2 and CG3, respectively). The exemplary groupings of the sthreads $S_1$ through $S_8$ in the concurrency groups 510-530 are arbitrarily chosen for purposes of illustration. As noted, UP-coded sthreads in the same concurrency group are not permitted to execute concurrently. Consequently, the sthread $S_1$ may execute concurrently with any of the sthreads $S_4$ through $S_8$, but may not execute concurrently with sthreads $S_2$ or $S_3$ assigned to the same concurrency group 510 (CG1).

Figure 6:
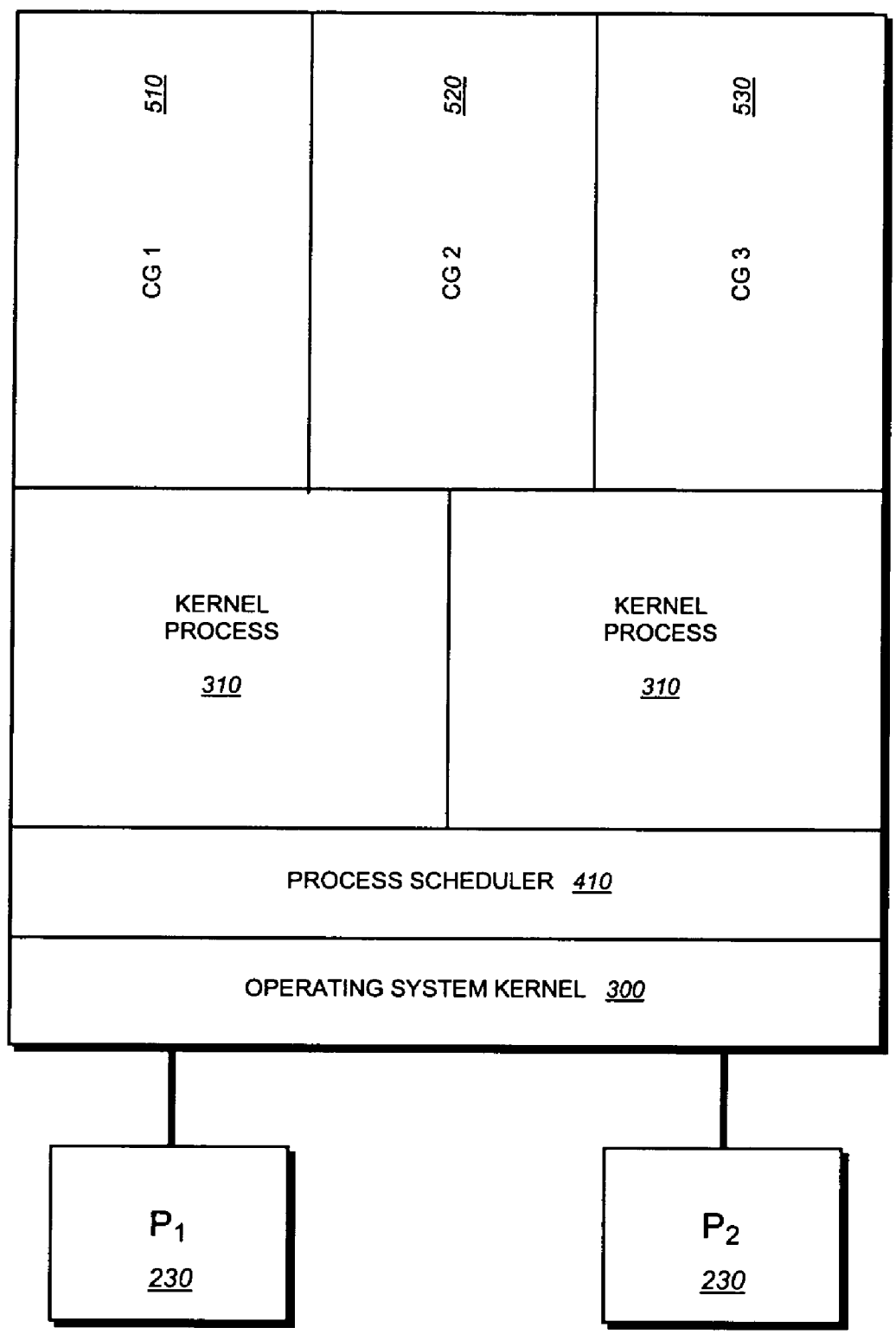
FIG. 6 is a schematic block diagram illustrating a plurality of concurrency groups which may be multiplexed on different kernel processes in FIG. 1's illustrative network cache.

FIG. 6 is a schematic block diagram illustrating the exemplary concurrency groups 510-530 which may be concurrently executed by a plurality of processors 230, e.g., in the network cache 200. To that end, the plurality of processors (e.g., $P_1$ and $P_2$) implement an operating system's core services through program code embodied in an operating-system kernel 300, such as the Data Ontap microkernel available from Network Appliance. The kernel 300 is coupled to a process scheduler 410 which determines when kernel processes 310 are executed by the processors 230, and also determines which processors execute which processes. For instance, the scheduler 410 may schedule a kernel is process 310 to execute on a processor 230 until the process completes its execution or until it has executed on the processor for a predetermined period of time. According to an illustrative embodiment, one or more of the kernel processes 310 (or other execution vehicles) are configured to access the concurrency groups CG1 510, CG2 520 and CG3 530, as described in more detail below.

Figure 7:
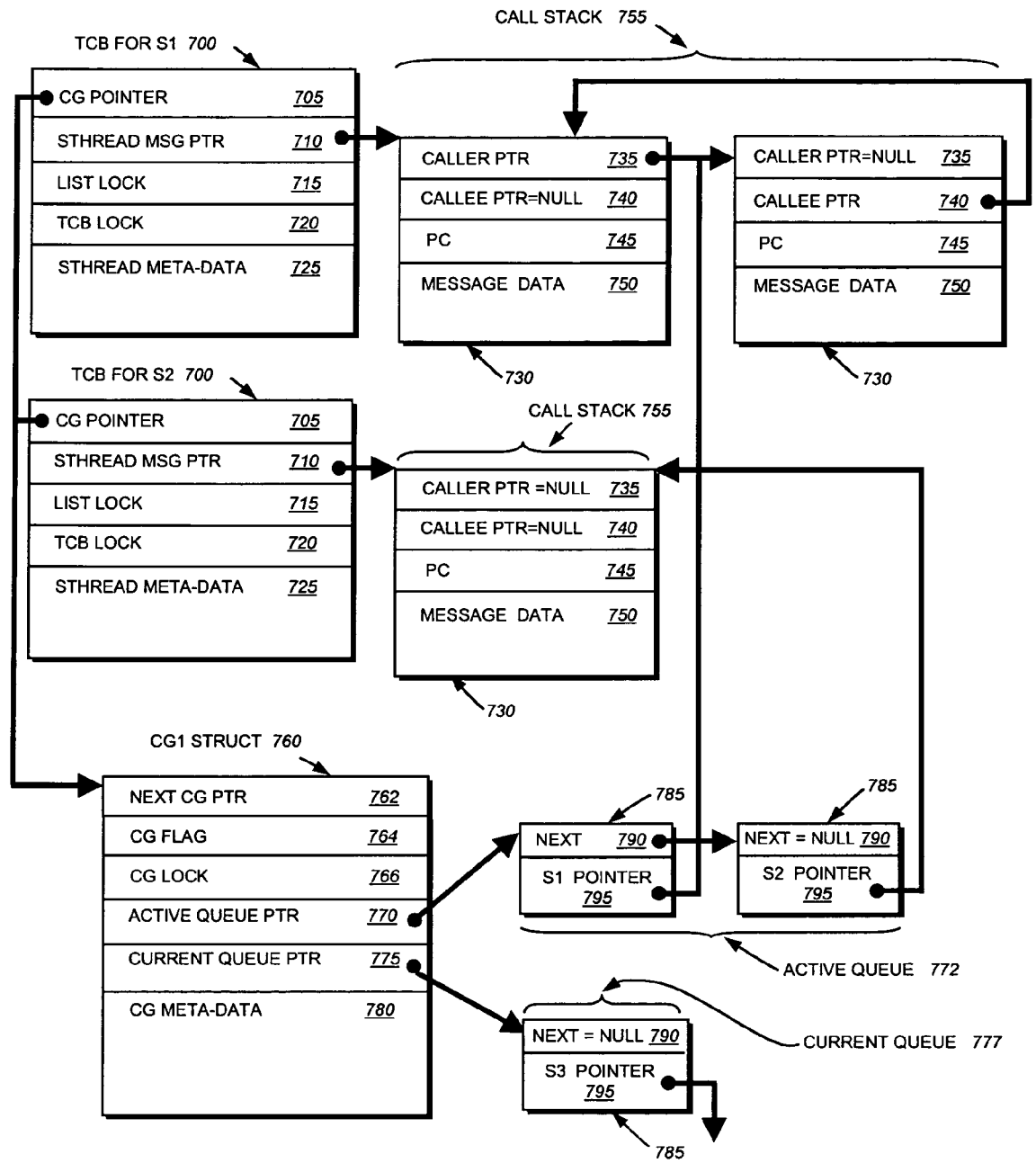
FIG. 7 is a schematic block diagram illustrating two exemplary thread control blocks (TCB) and an illustrative concurrency-group data structure which advantageously may be associated with the TCBs.

FIG. 7 illustrates exemplary thread control blocks 700 (TCB) that are respectively associated with the UP-coded sthreads $S_1$ and $S_2$ in the concurrency group 510 ("CG1"). In accordance with the illustrative embodiment, each TCB 700 is configured to store, inter alia, a CG pointer 705, an sthread-message pointer 710, a list lock 715, a TCB lock 720 and sthread meta-data 725 for its respective sthread $S_1$ or $S_2$. Of course, those skilled in the art will appreciate that the contents and arrangement of the TCBs 700 are merely exemplary and may be varied within the scope of the present invention.

The sthread meta-data 725 associated with the sthread $S_1$ or $S_2$ includes data and parameters that may be used by a processor 230 to control the sthread's execution. For instance, the meta-data may include flag values, semaphore values, condition variables, etc. which may be loaded into a processor-accessible memory before the sthread is executed by the processor. A TCB lock 720 may be employed to prevent the sthread metadata 725 from being accessed by more than one processor 230 at a time. The TCB lock may be a conventional mutex lock, such as a spin lock, semaphore, or the like. For example, a first kernel process 310 executing on a first processor may be configured to set the TCB lock 720 to a first value (e.g., "1") before the first processor can access the TCB's sthread meta-data 725. In this situation, the value of the TCB lock 720 alerts other kernel processes that the meta-data 725 is "in use" and may not be accessed by processors other than the first processor. Later, the first kernel process may set the TCB lock 720 to a second value (e.g., "0") to indicate the sthread meta-data 725 is no longer in use by the first processor. Thereafter, the TCB lock 720 may be acquired by other kernel processes or re-acquired by the first kernel process.

Each TCB 700 includes an sthread-message pointer 710 that stores the memory location of a list of sthread "messages" 730 associated with the sthread $S_1$ or $S_2$. Each sthread message 730 in the list stores thread-state information associated with a call or suspension in the sthread's execution. In this sense, a list of sthread messages 730 functions as a "call stack" 755, and each message in the list serves as a stack frame, or "activation record." For example, as shown, the right-most sthread message 730 in each call stack 755 corresponds to the "top" of the stack, i.e., the most recent suspension of the sthread code. Each call stack 755 is preferably implemented as a doubly-linked list of one or more sthread messages 730, such that a caller pointer 735 in a message 730 indicates the memory location of the next, "higher" sthread message in the stack and a callee pointer 740 indicates the memory location of the stack's previous, "lower" sthread message.

Illustratively, each sthread message 730 also stores message data 750 containing thread-context information that is loaded into a processor-accessible memory before execution of the suspended sthread is resumed by the processor 230. For instance, such context information may include, inter alia, local-variable values and hardware-register contents corresponding to a point in the sthread code where the sthread was suspended or interrupted. In addition, each message 730 also includes a program-counter (PC) value 745 corresponding to the next program-code instruction to be executed by the processor when the sthread's execution resumes.

Because sthread messages 730 for the sthreads $S_1$ and $S_2$ may be dynamically added or removed at run-time, each TCB 700 may include a list lock 715 that indicates when the TCB's call stack 755 is being modified. For instance, the list lock 715 may equal a first value when an sthread message is being added to or removed from the TCB's call stack, e.g., by a thread or process, and may equal a second value otherwise. In general, when a TCB's associated sthread is a member of a concurrency group, the TCB's CG pointer 705 may be used to locate a concurrency-group data structure (i.e., "CG Struct") associated with the sthread's assigned concurrency group. For example, each illustrated TCB 700 includes a concurrency-group (CG) pointer 705 that stores a value indicating the memory location, e.g., in the memory 250, of a concurrency-group data structure 760 ("CG1 Struct") associated with the concurrency group 510 ("CG1").

The CG1 Struct 760 contains run-time information that enables a kernel process (or other execution vehicle) to execute the concurrency group 510's sthreads in an orderly manner. The CG1 Struct preferably resides in the memory 250 at a location accessible to the kernel processes 310. FIG. 7's exemplary CG1 Struct 760 stores, inter alia, a next-CG pointer 762, a CG flag 764, a CG lock 766, an active-queue pointer 770, a current-queue pointer 775 and CG meta-data 780.

The CG meta-data 780 includes, e.g., statistics, flags, condition variables, etc. associated with the CG1 Struct 760. The meta-data may be accessible to kernel processes 310 that execute UP-coded sthreads 430 (i.e., sthreads $S_1$, $S_2$ and $S_3$) assigned to the concurrency group 510. As noted, each TCB 700 contains a CG pointer 705 that references a single CG Struct 760. However, conversely, a CG Struct 760 may be referenced by a plurality of different CG pointers 705. Accordingly, the CG meta-data 780 may include a TCB reference count (not shown) that indicates the number of CG pointers 705 referencing the CG1 Struct 760. In such an embodiment, the CG1 Struct may be deallocated or destroyed when the TCB reference count equals zero.

The active-queue pointer 770 stores the memory location, e.g., in the memory 250, of a list of "active" sthreads in the concurrency group 510 which are currently in an executable (i.e., non-blocked) state. The list of active sthreads is preferably organized as a first-in first-out (FIFO) queue, i.e., an "active queue" 772. Each active-queue entry 785 contains both a pointer 795 to an sthread message 730 at the top of an sthread's call stack 755 and a pointer 790 to the next logical entry 785 in the active queue. Alternatively, rather than store pointers 795 to sthread messages, those skilled in the art will understand that copies of the referenced sthread messages 730 may be directly stored in the active-queue entries 785. For purposes of illustration, CG1 Struct 760's active queue contains two entries 785 corresponding to the sthreads $S_1$ and $S_2$. Namely, the pointer 795 in the first entry in the active queue 772 references the sthread message 730 at the top of sthread $S_1$'s call stack 755, and the pointer 795 in the second active-queue entry references the top of sthread $S_2$'s call stack.

The current-queue pointer 775 in the CG1 Struct 760 stores the memory location, e.g., in the memory 250, of a list of sthreads which are waiting to be transferred to the active queue 772 so they may be executed by one or more processors 230. The list of sthreads referenced by the current-queue pointer 775 is preferably organized as a FIFO queue, i.e., a "current queue" 777. Operationally, when an sthread becomes "runnable" (i.e., executable), it is first enqueued on the current queue 777 before being transferred to the active queue 772. Subsequently, the sthread may be dequeued from the active queue and executed to completion. Advantageously, an sthread may be safely enqueued on the current queue 777 even while other sthreads are being dequeued from the active queue 772 and executed to completion.

Each current-queue entry 785 contains both a pointer 795 to an sthread message 730 at the top of an sthread's call stack 755 and a pointer 790 to the next logical entry 785 in the current queue. As shown, the illustrative current queue 777 contains only a single entry 785 corresponding to the UP-coded sthread $S_3$. Accordingly, the $S_3$ pointer 795 references an sthread message at the top of sthread $S_3$s call stack (not shown). Of note, only sthread messages corresponding to UP-coded sthreads in the concurrency group 510 (CG1) are referenced by (or included in) the CG1 Struct 760's active and current queues.

The CG flag 764 stores a value that indicates an operational state of the concurrency group 510. The CG flag is set to different values depending on whether the concurrency group 510 is in, e.g., a "running," "queued" or "suspended" state. The concurrency group is in the suspended state when it does not contain any sthreads that are executable, i.e., sthreads are not enqueued on the active queue 772 or current queue 777. In other words, in the suspended state, execution of each sthread in the concurrency group 510 has either been terminated or suspended. The concurrency group transitions from the suspended state to the queued state when at least one of its sthreads becomes executable. As described in more detail below, a concurrency group in its queued state is enqueued on a concurrency-group run queue (i.e., "CG run queue"). A concurrency group is transitioned from the queued state to the running state when it is dequeued from the CG run queue. While in the running state, executable sthreads in the concurrency group are dequeued from the active queue 772 and executed to completion.

Figure 8:
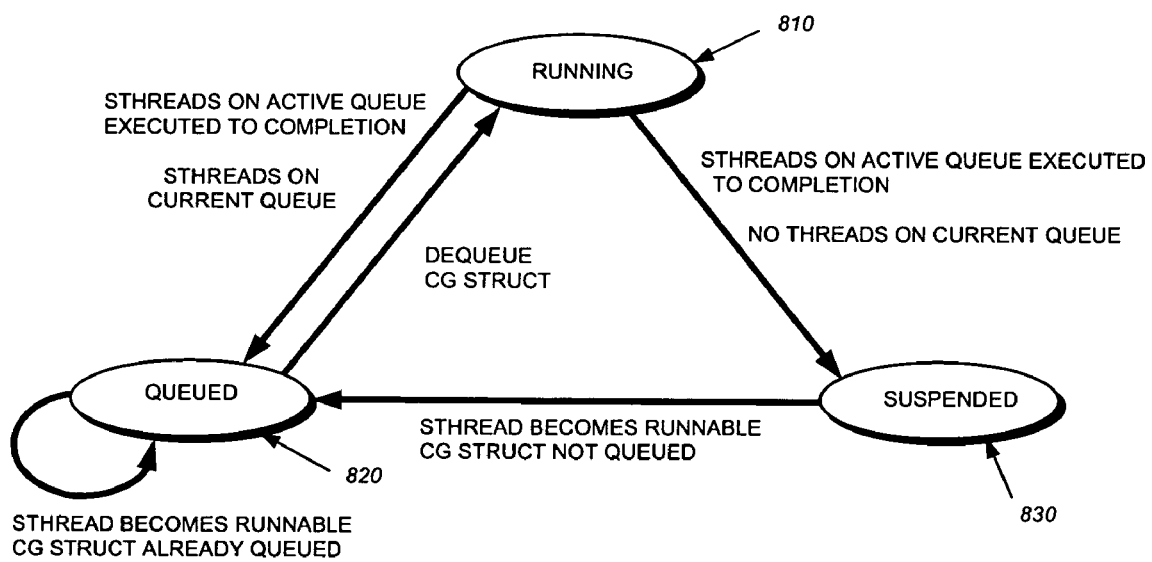
FIG. 8 is a schematic state diagram illustrating three exemplary states to which a flag in FIG. 7's concurrency-group data structure may be set.

FIG. 8 illustrates a state diagram of the exemplary running, queued and suspended states 810-830 to which the value of CG flag 764 may correspond. The concurrency group 510 remains in the suspended state 830 until at least one of its sthreads becomes executable. At that time, the entity (thread, interrupt, process, etc.) that causes the sthread to become executable (i) enqueues a current-queue entry 785 for the sthread on the current queue 777, (ii) sets the CG flag 764 to a value consistent with the queued state 820 and (iii) enqueues the CG1 Struct 760 onto a CG run queue. The entity may cooperate with one or more other entities to perform these tasks. If additional sthreads in the concurrency group 510 become executable while the concurrency group is in its queued state 820, the concurrency group remains in the queued state.

When an execution vehicle, such as a kernel process 310, dequeues the CG1 Struct 760 from the CG run queue, the execution vehicle transitions the concurrency group 510 to the running state 810 by setting the CG flag 764 to an appropriate value. While the concurrency group is in the running state, the execution vehicle sequentially dequeues sthreads from the active queue 772 and executes the dequeued sthreads to completion. Notably, the execution vehicle may not need to acquire a lock or other synchronization mechanism for each sthread it dequeues from the active queue. Rather, the active queue 772 is "implicitly" locked, since other execution vehicles may not access sthreads on the active queue while the concurrency group 510 is in the running state.

After executing the active queue's sthreads, the execution vehicle returns the concurrency group 510 to either the queued state 820 or suspended state 830, depending on whether any sthreads are enqueued on the current queue 777. If there are no sthreads enqueued on the current queue, then the execution vehicle returns the concurrency group 510 to the suspended state 830 by setting the CG flag 764 to an appropriate value. Otherwise, the CG1 Struct 760 is re-enqueued on the CG run queue and the CG flag 764 is set equal to a value corresponding to the queued state 820.

The CG lock 766 protects the CG flag 764 from being modified by more than one thread, process, etc. at a time. The CG lock may be a conventional mutex lock, such as a spin lock, semaphore, or the like. For example, a kernel process 310 may be configured to set the CG lock 766 to a first value (e.g., "1") before it modifies the value of the CG flag 764. Later, the kernel process may set the CG lock 766 to a second value (e.g., "0") to notify other entities (i.e., threads, processes, etc.) that the value of the CG flag 764 is no longer being modified.

The next-CG pointer 762 may be used to store the memory location, e.g., in the memory 250, of another CG Struct 760. For example, a list of CG Structs may be constructed by logically linking the CG Structs through their respective next-CG pointers 762. The linked list may be implemented as a FIFO queue, e.g., whose contents is a run queue of concurrency groups. The next-CG pointer value 762 at the head or tail of the CG run queue may be set equal to a predetermined "NULL" value (or equivalent) to indicate its relative position in the queue.

Figure 9:
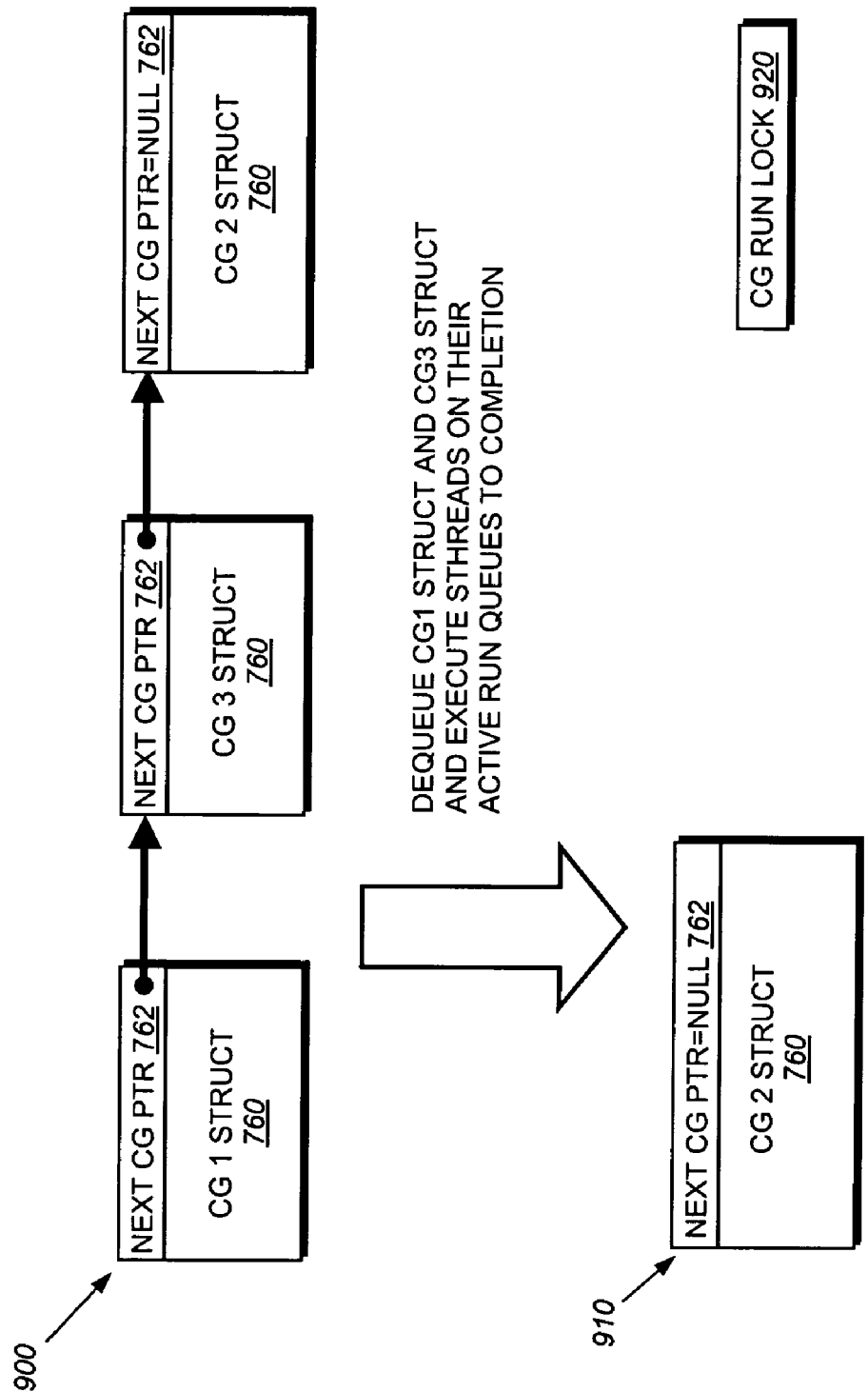
FIG. 9 is a schematic block diagram illustrating a concurrency-group run queue that may be advantageously employed in accordance with the present invention.

FIG. 9 illustrates an exemplary CG run queue 900 that may be accessed by a plurality of execution vehicles, such as kernel processes 310. A plurality of CG Structs 760 are enqueued on the CG run queue 900 and logically linked by their respective next-CG pointer values 762. However, those skilled in the art will appreciate that the CG run queue may be constructed in other ways as well. For example, the CG run queue 900 may contain an ordered list of pointers (not shown) that reference the memory locations, e.g., in the memory 250, of CG Structs 760 in the CG run queue.

Because the CG run queue 900 may be accessible to multiple execution vehicles, a CG run lock 920 may be employed to ensure that only one execution vehicle has access to the CG run queue at a time. The lock 920 may be a conventional mutex lock, semaphore, etc. that equals a first value when the CG run queue 900 is being modified and equals a second value otherwise. For example, a first execution vehicle may acquire the CG run lock 920 by setting it to the first value. At this point, the first execution vehicle is given exclusive access to the CG run queue 900 until it releases the lock 920 by setting it to the second value. Other execution vehicles may periodically test (i.e., "spin on") the value of the CG run lock 920 to determine when the lock is equal to the second value and is therefore "free" to be acquired.

In operation, a process scheduler may schedule different kernel processes 310 (or other execution vehicles) that execute on a plurality of processors 230, e.g., processors $P_1$ and $P_2$, at substantially the same time. Illustratively, each kernel process 310 executes a continuous loop of program code that repeatedly performs, inter alia, a sequence of steps for: acquiring the CG run lock 920, dequeueing a CG Struct 760 from the head of the CG run queue 900, releasing the CG run lock 920, acquiring the CG lock 766 in the dequeued CG Struct 760, setting the CG flag 764 in the dequeued CG Struct to a value indicative of the running state 810, releasing the CG lock 766, appending sthreads in the dequeued CG Struct's current queue 777 onto its active queue 772 and then executing sthreads in the active queue to completion.

After executing sthreads in the active queue 772 to completion, the kernel process 310 re-acquires the CG lock 766. At this point, if any sthreads are enqueued on the current queue 777, the kernel process modifies the value of the CG flag 764 so as to return the CG Struct 760 to the queued state 820. Then, the kernel process releases the CG lock 766 and re-enqueues the CG Struct onto the tail of the CG run queue 900. However, if no sthreads are enqueued on the current queue 777 after sthreads on the active queue 772 have finished executing, the kernel process 310 modifies the CG flag 764's value to transition the CG Struct 760 to the suspended state 830. The kernel process then releases the CG lock 766.

For purposes of illustration, the exemplary CG run queue 900 is shown as a linked list of CG Structs 760 corresponding to the concurrency groups CG1 510, CG2 520 and CG3 530. The kernel processes 310 executing concurrently on the processors $P_1$ and $P_2$ respectively dequeue CG1 Struct 760 and CG3 Struct 760 from the head of the CG run queue 900, thereby resulting in a modified CG run queue 910 containing only CG2 Struct 760. In contrast to previous implementations, UP-coded sthreads in the dequeued concurrency groups CG1 and CG3 may be safely executed by the processors $P_1$ and $P_2$ at substantially the same time, without having to incorporate conventional synchronization mechanisms into the sthreads' original UP code. However, it is noted that standard synchronization primitives still may be employed between the UP-coded sthreads executing concurrently on the processors $P_1$ and $P_2$. Moreover, although this illustrative embodiment involves concurrent execution of UP-coded sthreads in two concurrency groups (i.e., CG1 510 and CG3 530), it is expressly contemplated that an arbitrary number of UP-coded sthreads assigned to different, respective concurrency groups can execute concurrently in the above-described manner.

Figure 10:
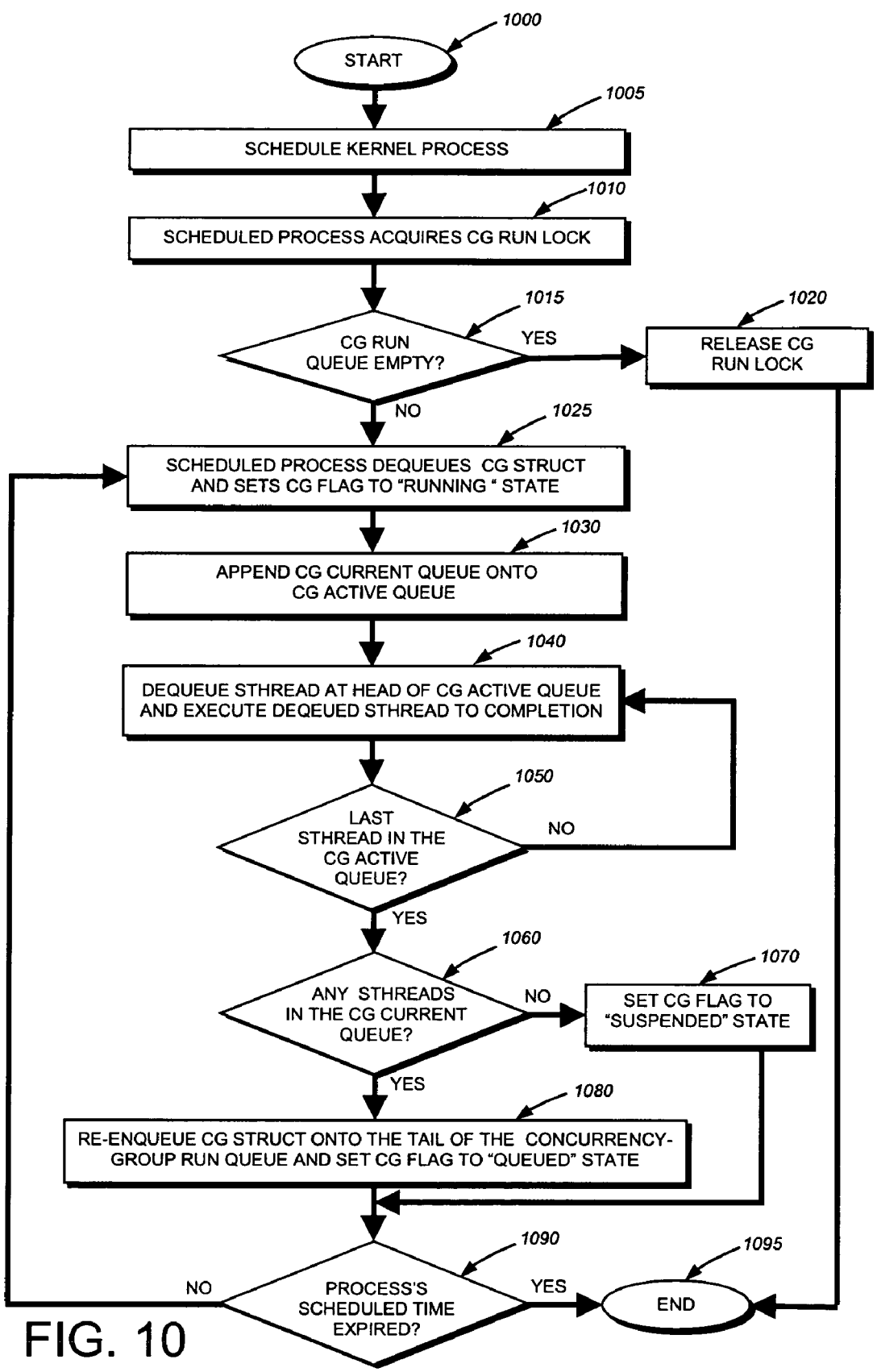
FIG. 10 is a flowchart illustrating a sequence of steps that may be performed by FIG. 1's illustrative network cache for executing UP-coded sthreads in a concurrency group.

FIG. 10 is a flowchart illustrating a sequence of steps that may be performed, e.g., in the network cache 200, for executing UP-coded sthreads multiplexed over a kernel process 310 running on a processor 230. Advantageously, the steps 1000-1095 may be performed for a first kernel process executing in the network cache 200, and, at substantially the same time, the steps also may be separately performed for one or more other kernel processes executing in the network cache. The sequence starts at step 1000 and proceeds to step 1005 where a process scheduler 410 schedules a kernel process 310 to execute on a processor 230.

At step 1010, the scheduled kernel process 310 locates a CG run lock 920 at a known location in the memory 250 and attempts to acquire the lock. If the value of the CG run lock indicates that the lock is in use, the kernel process may continue to spin on the CG run lock 920 until the lock becomes free. Having acquired the CG run lock, at step 1015 the kernel process determines whether a CG run queue 900 is empty. If so, the process releases the CG run lock at step 1020 and the sequence ends at step 1095. Otherwise, at step 1025, the process 310 dequeues a CG Struct 760 from the head of the CG run queue 900. The kernel process then releases the CG run lock 920 and acquires a CG lock 766 located at a known offset in the dequeued CG Struct 760. Next, the kernel process 310 sets a CG flag 764, also located at a known offset in the dequeued CG Struct, to a value corresponding to the running state 810. The kernel process then releases the CG lock 766.

At step 1030, the scheduled kernel process 310 locates a current-queue pointer 775 and an active-queue pointer 970 at known offsets in the dequeued CG Struct 760. The kernel process appends the contents of a current queue 777 referenced by the current-queue pointer 775 onto an active queue 772 referenced by the active-queue pointer 770. Here, it is assumed that at least one executable sthread is enqueued in the current queue 777.

At step 1040, the scheduled kernel process dequeues an sthread message 730 from the head of the active queue 772. As previously noted, the dequeued message corresponds to the top of an sthread's call stack 755. Thread-context information, such as a value 745 and message data 750, is copied out of the dequeued sthread message and into a processor-accessible memory. In addition, sthread meta-data 725 may be copied from the sthread's TCB 700 into the processor-accessible memory, as well. If the kernel process determines a TCB lock 720 in the TCB 700 is free, then the process acquires the TCB lock and executes the dequeued sthread to completion (i.e., completely executes the sthread using each sthread message 730 in the sthread's call stack 755). In the event that the kernel process cannot execute the sthread because the TCB lock 720 is in use, the process may wait for the TCB lock to become free, i.e., spin on the TCB lock, or may re-enqueue the dequeued sthread message onto the tail of either the current queue 777 or active queue 772.

After the kernel process 310 finishes executing an sthread, the kernel process 310 releases the TCB lock 720, and, at step 1050, determines whether any sthreads remain enqueued on the active queue 772. If at least one sthread is enqueued on the active queue 772, the sequence returns to step 1040. On the other hand, when there are no more sthreads in the active queue, the sequence proceeds to step 1060 where the kernel process determines whether there are any sthreads enqueued on the current queue 777.

At step 1060, if there is at least one sthread enqueued on the current queue, then, at step 1080, the kernel process 310 acquires the CG lock 766 and modifies the CG flag 764 value to coincide with the queued state 820. The kernel process then releases the CG lock 766 and acquires the CG run lock 920. Thereafter, the process 310 re-enqueues the dequeued CG Struct 760 back onto the tail of the CG run queue 900 and subsequently releases the lock 920. The sequence then proceeds to step 1090.

If, at step 1060, the kernel process 310 determines that there are not any sthread messages enqueued on the current queue 777, then, at step 1070, the kernel process acquires the CG lock 766 and modifies the CG flag 764 value to coincide with the suspended state 830. The kernel process then releases the CO lock 766. At step 1090, a determination is made whether the process's scheduled time has expired. If so, the sequence ends at step 1095. Otherwise, the sequence returns to step 1020.

D. Conclusion

The foregoing has been a detailed description of an illustrative embodiment of the invention. Various modifications and additions can be made without departing from the spirit and scope of the invention. For example, although the illustrative embodiment is described in terms of a multi-threaded MP system where UP-coded sthreads 430 are multiplexed over kernel processes 310, it is expressly contemplated that the inventive technique is equally applicable in a message-based MP system where one or more messages are multiplexed over an execution vehicle that processes those messages in an orderly manner. For example, a plurality of UP-coded sthread messages 730 may be multiplexed over a thread that is configured to process those messages. Thus, in this embodiment, the UP-coded messages are workloads multiplexed over the thread that serves as an execution vehicle. More generally, those skilled in the art will understand that messages may be formatted in a variety of different ways so as to be executable over appropriate execution vehicles in an MP system.

In the context of a message-based system, a concurrency group is defined as a set of one or more messages not permitted to execute concurrently. For example, a set of messages may belong to the same concurrency group because they execute a common block of program code that cannot safely execute concurrently in the MP system. As described, messages may be assigned to concurrency groups during software development, run-time, compile-time, etc. In accordance with the inventive techniques herein, messages in different concurrency groups can execute in the message-based MP system at substantially the same time. For instance, a first execution vehicle may dequeue a first concurrency group from a CG run queue, and a second execution vehicle executing on a different processor in the MP system may dequeue a second concurrency group from the CG run queue. In this case, the first and second execution vehicles can concurrently execute messages enqueued in the active queues 772 of their respective first and second concurrency groups.

While the illustrative network cache 200 may be a general-purpose multiprocessor computer system, it may also be a specialized computer system, such as a gaming console. Further, it is expressly contemplated that the teachings of this invention can be implemented as software, including a computer-readable medium having program instructions executing on a computer, hardware, firmware, or a combination thereof. Moreover, those skilled in the art will also understand that the teachings set forth herein are not limited to any specific operating system (OS) implementation, and instead may be executed by a wide variety of OS platforms. Accordingly this description is meant to be taken only by way of example and not to otherwise limit the scope of the invention.

What is claimed is:

1. A method for executing uniprocessor (UP) coded workloads in a multiprocessor (MP) computer system without having to rewrite the UP-coded workloads' code, comprising:

identifying threads in the uniprocessor coded workloads (UP-workloads) which can execute concurrently, and identifying threads in the UP-workloads which cannot execute concurrently;

assigning first threads which cannot execute concurrently to a first concurrency group, and assigning second threads which cannot execute concurrently to a second concurrency group, where any thread in the first concurrency group can execute concurrently with any thread in the second concurrency group;

compiling the UP workload to execute on the MP system, the threads in the first concurrency group compiled to be prevented from executing concurrently, the threads in the second concurrency group compiled to be prevented from executing concurrently, and the threads in the first and the second concurrency groups compiled to execute concurrently;

scheduling first and second execution vehicles that respectively execute on different processors in the MP computer system at substantially the same time;

acquiring the first concurrency group by the first execution vehicle and the second concurrency group by the second execution vehicle; and executing UP-coded workloads in the first concurrency group through the first execution vehicle at substantially the same time as UP-coded workloads in the second concurrency group are executed through the second execution vehicle.

2. The method according to claim 1, wherein the UP-coded workloads are UP-coded threads, and the first and second execution vehicles are first and second processes.

3. The method according to claim 1, wherein the UP-coded workloads are messages, and the first and second execution vehicles are first and second threads.

4. The method according to claim 1, wherein the step of acquiring the first and second concurrency groups further comprises:

dequeueing from a concurrency-group run queue a first concurrency-group data structure associated with the first concurrency group; and dequeueing from the concurrency-group run queue a second concurrency-group data structure associated with the second concurrency group.

5. The method according to claim 4, further comprising:

setting a first CG flag in the first concurrency-group data structure to a value indicating that the first concurrency group is in a running state; and setting a second CG flag in the second concurrency-group data structure to a value indicating that the second concurrency group is in a running state.

6. The method according to claim 5, further comprising:

in response to the first execution vehicle finishing execution of the UP-coded workloads in the first concurrency group, the first execution vehicle performing the steps:

A) if at least one UP-coded workload in the first concurrency group is executable:
 (i) setting the value of the first CG flag to a value indicating that the first concurrency group is in a queued state;
 (ii) re-enqueueing the first concurrency-group data structure onto the concurrency-group run queue;

B) if there are not any UP-coded workloads in the first concurrency group that are executable, setting the first CG flag to a value indicating that the first concurrency group is in a suspended state;

C) dequeueing from the concurrency-group run queue a third concurrency-group data structure associated with a third concurrency group; and D) setting a third CG flag in the third concurrency-group data structure to a value indicating that the third concurrency group is in a running state.

7. The method according to claim 4, further comprising:
appending UP-coded workloads enqueued on a first current queue in the first concurrency-group data structure onto a first active queue in the first concurrency-group data structure; and
appending UP-coded workloads enqueued on a second current queue in the second concurrency-group data structure onto a second active queue in the second concurrency-group data structure.

8. The method according to claim 7, further comprising:
dequeueing UP-coded workloads in the first and second concurrency groups from the first and second active queues, respectively; and
executing the dequeued UP-coded workloads to completion.

9. The method according to claim 1, wherein at least one of the UP-coded workloads is organized into the one or more concurrency groups at run-time.

10. The method according to claim 1, wherein the MP computer system is a network cache.

11. A multiprocessor (MP) computer system configured to execute a computer code derived from uniprocessor (UP) coded threads without having to rewrite the UP-coded threads' code, the MP computer system having the computer code, comprising:
a plurality of processors;
threads in the uniprocessor coded workloads (UP-workloads) which can execute concurrently, and threads in the UP-workloads which cannot execute concurrently;
first threads which cannot execute concurrently assigned to a first concurrency group, and second threads which cannot execute concurrently assigned to a second concurrency group, where any thread in the first concurrency group can execute concurrently with any thread in the second concurrency group;
the UP workload compiled to execute on the MP system, the threads in the first concurrency group compiled to be prevented from executing concurrently, the threads in the second concurrency group compiled to be prevented from executing concurrently, and the threads in the first and the second concurrency groups compiled to execute concurrently;
a memory having a plurality of storage locations addressable by the plurality of processors for storing data and program code, the memory being configured to store a separate concurrency-group data structure for each of the first and second concurrency groups, each concurrency-group data structure: having,
an active-queue pointer storing a location in the memory of an active queue of UP-coded thread messages associated with UP-coded threads in an executable state; and
a current-queue pointer storing a location in the memory of a current queue of UP-coded thread messages associated with UP-coded threads waiting to be transferred to the active queue.

12. The MP computer system according to claim 11, wherein each concurrency-group data structure further comprises a CG flag that stores a value indicating an operational state of a concurrency group associated with the concurrency-group data structure.

13. The MP computer system according to claim 11, wherein each UP-coded thread message stored in the active queue and current queue stores a location in the memory of a top of a call stack associated with a specific UP-coded thread.

14. The MP computer system according to claim 13, wherein the call stack is accessible through a thread control block (TCB) associated with the specific UP-coded thread, the TCB including a CG pointer for storing a memory location of a concurrency-group data structure.

15. The MP computer system according to claim 11, wherein each concurrency-group data structure further comprises meta-data information associated with a concurrency group.

16. The MP computer system according to claim 11, wherein the MP computer system is a network cache.

17. An apparatus for executing uniprocessor (UP) coded workloads in a multiprocessor (MP) computer system without having to rewrite the UP-coded workloads' code, comprising:
means for organizing the UP-coded workloads into one or more concurrency groups, wherein UP-coded workloads in the same concurrency group are not permitted to execute concurrently with one another in the MP computer system;
means for identifying threads in the uniprocessor coded workloads (UP-workloads) which can execute concurrently, and identifying threads in the UP-workloads which cannot execute concurrently;
means for assigning first threads which cannot execute concurrently to a first concurrency group, and assigning second threads which cannot execute concurrently to a second concurrency group, where any thread in the first concurrency group can execute concurrently with any thread in the second concurrency group;
means for compiling the UP workload to execute on the MP system, the threads in the first concurrency group compiled to be prevented from executing concurrently, the threads in the second concurrency group compiled to be prevented from executing concurrently, and the threads in the first and the second concurrency groups compiled to execute concurrently;
means for scheduling first and second execution vehicles that respectively execute on different processors in the MP computer system at substantially the same time;
means for acquiring the first concurrency group by the first execution vehicle and the second concurrency group by the second execution vehicle; and
means for executing UP-coded workloads in the first concurrency group through the first execution vehicle at substantially the same time as UP-coded workloads in the second concurrency group are executed through the second execution vehicle.

18. The apparatus according to claim 17, wherein the UP-coded workloads are UP-coded threads, and the first and second execution vehicles are first and second processes.

19. The apparatus according to claim 17, wherein the UP-coded workloads are messages, and the first and second execution vehicles are first and second threads.

20. The apparatus according to claim 17, further comprising:
means for dequeueing from a concurrency-group run queue a first concurrency-group data structure associated with the first concurrency group; and
means for dequeueing from the concurrency-group run queue a second concurrency-group data structure associated with the second concurrency group.

21. The apparatus according to claim 20, further comprising:
means for setting a first CG flag in the first concurrency-group data structure to a value indicating that the first concurrency group is in a running state; and means for setting a second CG flag in the second concurrency-group data structure to a value indicating that the second concurrency group is in a running state.

22. The apparatus according to claim 21, further comprising:
means for setting the value of the first CG flag to a value indicating that the first concurrency group is in a queued state or in a suspended state; and
means for re-enqueueing the first concurrency-group data structure onto the concurrency-group run queue.

23. The apparatus according to claim 20, further comprising:
means for appending UP-coded workloads enqueued on a first current queue in the first concurrency-group data structure onto a first active queue in the first concurrency-group data structure; and
means for appending UP-coded workloads enqueued on a second current queue in the second concurrency-group data structure onto a second active queue in the second concurrency-group data structure.

24. The apparatus according to claim 23, further comprising:
means for dequeueing UP-coded workloads in the first and second concurrency groups from the first and second active queues, respectively; and
means for executing the dequeued UP-coded workloads to completion.

25. A computer-readable media comprising instructions for execution in one or more processors for executing uniprocessor (UP) coded workloads in a multiprocessor (MP) computer system without having to rewrite the UP-coded workloads' code, comprising:
identifying threads in the uniprocessor coded workloads (UP-workloads) which can execute concurrently, and identifying threads in the UP-workloads which cannot execute concurrently;
assigning first threads which cannot execute concurrently to a first concurrency group, and assigning second threads which cannot execute concurrently to a second concurrency group, where any thread in the first concurrency group can execute concurrently with any thread in the second concurrency group;
compiling the UP workload to execute on the MP system, the threads in the first concurrency group compiled to be prevented from executing concurrently, the threads in the second concurrency group compiled to be prevented from executing concurrently, and the threads in the first and the second concurrency groups compiled to execute concurrently;
scheduling first and second execution vehicles that respectively execute on different processors in the MP computer system at substantially the same time;
acquiring the first concurrency group by the first execution vehicle and the second concurrency group by the second execution vehicle; and
executing UP-coded workloads in the first concurrency group through the first execution vehicle at substantially the same time as UP-coded workloads in the second concurrency group are executed through the second execution vehicle.

26. The computer-readable media according to claim 25, wherein the UP-coded workloads are UP-coded threads, and the first and second execution vehicles are first and second processes.

27. The computer-readable media according to claim 25, wherein the UP-coded workloads are messages, and the first and second execution vehicles are first and second threads.

28. A method, comprising:
identifying threads in a uniprocessor coded workload (UP-workload) which can execute concurrently, and identifying threads in the UP-workload which cannot execute concurrently;
assigning first threads which cannot execute concurrently to a first concurrency group, and assigning second threads which cannot execute concurrently to a second concurrency group, where any thread in the first concurrency group can execute concurrently with any thread in the second concurrency group, and repeating assigning threads which cannot execute concurrently to further concurrency groups to form a plurality of concurrency groups, where any thread in a concurrency group can execute concurrently with any thread in a different concurrency group;
compiling the UP workload to execute on the MP system, the threads in the first concurrency group compiled to be prevented from executing concurrently, the threads in the second concurrency group compiled to be prevented from executing concurrently, and the threads in the first and the second concurrency groups compiled to execute concurrently, and repeating to prevent threads in any of the plurality of concurrency groups from executing concurrently, and permitting threads in different concurrency groups to execute concurrently;
scheduling a plurality of execution vehicles that respectively execute on different processors in the MP computer system at substantially the same time;
acquiring by each execution vehicle of the plurality of execution vehicles a concurrency group from the plurality of concurrency groups; and
executing workloads in the plurality of concurrency groups through the plurality of execution vehicles at substantially the same time.

29. The method according to claim 28, wherein the workloads are uniprocessor (UP) coded threads, and the plurality of vehicles are processes.

30. The method according to claim 28, wherein the workloads are messages, and the plurality of vehicles are first and second threads.

31. The method according to claim 28, wherein the workloads are uniprocessor (UP) coded workloads.

* * * * *